US012747704B1

(12) United States Patent
Cooling et al.

(10) Patent No.: US 12,747,704 B1

(45) Date of Patent: Sep. 29, 2026

(54) SPOOL SELECTION TRANSMISSIONS WITH TOWERSHAFT CONNECTIONS

(71) Applicant: Hamilton Sundstrand Corporation, Charlotte, NC (US)

(72) Inventors: Aaron Cooling, Janesville, WI (US); Matthew Daniel Koehler, Rockford, IL (US); Cavit Hasan Kreci, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 19/323,799

(22) Filed: Sep. 9, 2025

(51) Int. Cl.

| | |
|---|---|
| ***F02C 7/36*** | (2006.01) |
| ***F02C 6/00*** | (2006.01) |
| ***F16D 21/02*** | (2006.01) |
| ***F16D 23/02*** | (2006.01) |

(52) U.S. Cl.

CPC .................. *F02C 7/36* (2013.01); *F02C 6/00* (2013.01); *F16D 21/02* (2013.01); *F16D 23/02* (2013.01); *F05D 2220/70* (2013.01); *F05D 2260/4023* (2013.01); *F05D 2260/4031* (2013.01)

(58) Field of Classification Search

CPC .... F02C 7/32; F02C 7/36; F02C 7/268; F02C 7/275; F02C 3/04; F02C 3/107; F02C 6/00; F02C 7/26; F02C 7/277; F01D 15/10; F01D 15/12; F01D 25/36; F01D 15/08; F01D 19/00; F01D 5/02; F01D 5/06; F05D 2220/76; F05D 2260/4023; F05D 2220/32; F05D 2260/40; F05D 2220/323; F05D 2260/4031; F05D 2240/40; F05D 2240/60; F05D 2250/311; F05D 2250/36; F05D 2260/403; F05D 2260/84; F05D 2260/85; F05D 2270/304; F05D 2270/20; F05D 2220/70; H02K 7/1823; F16H 3/006; F16D 21/02; F16D 23/02; F16D 11/14; F16D 41/22; F16D 43/26; F16D 41/069; F02N 11/00

See application file for complete search history.

(56) References Cited

U.S. PATENT DOCUMENTS

| | | | | |
|---|---|---|---|---|
| 7,481,062 | B2 * | 1/2009 | Gaines ................ | F16H 37/0826 60/793 |
| 10,328,799 | B2 * | 6/2019 | Duong .............. | F16H 61/66259 |
| 10,563,591 | B2 * | 2/2020 | Muldoon ................ | F01D 15/10 |
| 11,333,077 | B2 | 5/2022 | Foutch et al. | |
| 11,346,427 | B2 | 5/2022 | Duong et al. | |
| 11,591,967 | B2 * | 2/2023 | Foutch ...................... | F02C 7/32 |
| 12,065,973 | B2 | 8/2024 | Kupratis et al. | |
| 2013/0247539 | A1 | 9/2013 | Hoppe | |
| 2016/0356378 | A1 * | 12/2016 | Drosback ............ | F16H 61/2807 |
| 2018/0283281 | A1 | 10/2018 | Veilleux, Jr. et al. | |
| 2024/0271574 | A1 * | 8/2024 | Hill ........................... | F02C 7/32 |

* cited by examiner

*Primary Examiner* — Eric J Zamora Alvarez

(57) ABSTRACT

An apparatus is configured to selectively couple one of a first mechanical input and a second mechanical input to an electric machine. The apparatus includes a mechanical output configured to couple to a part of the electric machine. The apparatus also includes a sliding clutch configured to drive or be driven by the mechanical output. The apparatus further includes a selective actuator configured to move the sliding clutch in order to selectively control which mechanical input drives or is driven by the mechanical output. The second mechanical input is a gearbox configured to drive or be driven by an external mechanism.

20 Claims, 7 Drawing Sheets

SPOOL SELECTION TRANSMISSIONS WITH TOWERSHAFT CONNECTIONS

TECHNICAL FIELD

This disclosure is generally directed to transmission systems. More specifically, this disclosure is directed to spool selection transmissions with towershaft connections.

BACKGROUND

Various types of aircraft can use generators to produce electric power, where the generators extract mechanical power from gas turbine engines. Often times, this power is extracted from a high-pressure (HP) spool because (i) the HP spool typically has a narrow speed range and (ii) generators are significantly lighter and simpler when designed for a narrow speed range. While gas turbine engines can use less fuel if power is extracted from a low-pressure (LP) spool, a generator would typically be very heavy if directly driven from the LP spool.

SUMMARY

This disclosure relates to spool selection transmissions with towershaft connections.

In some examples, an apparatus may be configured to selectively couple one of a first mechanical input and a second mechanical input to an electric machine. The apparatus may include a mechanical output configured to couple to a part of the electric machine. The apparatus may also include a sliding clutch configured to drive or be driven by the mechanical output. The apparatus may further include a selective actuator configured to move the sliding clutch in order to selectively control which mechanical input drives or is driven by the mechanical output. The second mechanical input may be a gearbox configured to drive or be driven by an external mechanism.

Any single one or any combination of the following features may be used with any of the examples above.

The selective actuator may include at least one selector fork.

The apparatus may include a first remotely controllable mechanical disconnect configured to mechanically decouple the first mechanical input from the apparatus. The apparatus may include a second remotely controllable mechanical disconnect configured to mechanically decouple the second mechanical input from the apparatus. The apparatus may include a third remotely controllable mechanical disconnect configured to mechanically decouple the electric machine from the apparatus.

The first mechanical input may be a towershaft configured to drive or be driven by a first spool of a gas turbine engine. The external mechanism may be a second spool of the gas turbine engine.

The selective actuator may be configured to move the sliding clutch between (i) a first position in which the sliding clutch is mechanically coupled to the first mechanical input, (ii) a second position in which the sliding clutch is mechanically coupled to the second mechanical input, and (iii) a third position in which the sliding clutch is de-coupled from the first mechanical input and the second mechanical input.

The apparatus may be a line replaceable unit (LRU) separate from the first mechanical input, the second mechanical input, and the electric machine.

The mechanical output may include an output shaft configured to be axially aligned with the part of the electric machine. The first mechanical input may include a first input shaft configured to be axially aligned with the output shaft. The second mechanical input may include a second input shaft configured to be arranged in parallel with the output shaft.

The mechanical output may include an output shaft configured to be axially aligned with the part of the electric machine. The first mechanical input may include a first input shaft configured to be axially aligned with the output shaft. The second mechanical input may include a second input shaft configured to be coaxial with the output shaft.

The mechanical output may include an output shaft configured to be axially aligned with the part of the electric machine. The first mechanical input may include a first input shaft configured to be arranged in parallel with the output shaft. The second mechanical input may include a second input shaft configured to be axially aligned with the first input shaft.

The sliding clutch may include a first clutch and a second clutch mechanically linked by the selective actuator. The selective actuator may be configured to move the first clutch and the second clutch between (i) a first position in which the first clutch is mechanically coupled to the first mechanical input and the second clutch is de-coupled from the second mechanical input, (ii) a second position in which the first clutch is de-coupled from the first mechanical input and the second clutch is mechanically coupled to the second mechanical input, and (iii) a third position in which the first clutch is de-coupled from the first mechanical input and the second clutch is de-coupled from the second mechanical input.

In other examples, a system may include an electric machine configured to selectively drive or be driven by one of multiple spools of a gas turbine engine. The system may also include a spool selection transmission configured to selectively couple the one of the multiple spools to the electric machine. The spool selection transmission may include a mechanical output configured to couple to a part of the electric machine. The spool selection transmission may also include a sliding clutch configured to drive or be driven by the mechanical output. The spool selection transmission may further include a selective actuator configured to move the sliding clutch in order to selectively control which of the spools drives or is driven by the mechanical output. A gearbox may mechanically couple a first of the spools to the spool selection transmission via a first input shaft. The electric machine may be configured to speed match the sliding clutch to the one of the spools to facilitate engagement.

Any single one or any combination of the following features may be used with any of the examples above.

The selective actuator may include at least one selector fork.

The system may include a first remotely controllable mechanical disconnect configured to mechanically decouple a first of the spools from the spool selection transmission. The system may include a second remotely controllable mechanical disconnect configured to mechanically decouple a second of the spools from the spool selection transmission. The system may include a third remotely controllable mechanical disconnect configured to mechanically decouple the electric machine from the spool selection transmission.

The selective actuator may be configured to move the sliding clutch between (i) a first position in which the sliding clutch is mechanically coupled to a first of the spools, (ii) a second position in which the sliding clutch is mechanically coupled to a second of the spools, and (iii) a third position in which the sliding clutch is de-coupled from the first spool and the second spool.

The system may include a towershaft mechanically coupling a second of the spools to the spool selection transmission via a second input shaft.

The spool selection transmission may be an LRU separate from the towershaft, the gearbox, and the electric machine.

The mechanical output may include an output shaft configured to be axially aligned with the part of the electric machine, and the output shaft may pass through the gearbox. The second input shaft may be axially aligned with the output shaft. The first input shaft may be arranged in parallel with the output shaft.

The mechanical output may include an output shaft configured to be axially aligned with the part of the electric machine, and the output shaft may pass through the gearbox. The second input shaft may be axially aligned with the output shaft. The first input shaft may be coaxial with the output shaft.

The mechanical output may include an output shaft configured to be axially aligned with the part of the electric machine. The second input shaft may be arranged in parallel with the output shaft. The first input shaft may be axially aligned with the second input shaft.

The sliding clutch may include a first clutch and a second clutch mechanically linked by the selective actuator. The selective actuator may be configured to move the first clutch and the second clutch between (i) a first position in which the first clutch is mechanically coupled to a first of the spools and the second clutch is de-coupled from a second of the spools, (ii) a second position in which the first clutch is de-coupled from the first spool and the second clutch is mechanically coupled to the second spool, and (iii) a third position in which the first clutch is de-coupled from the first spool and the second clutch is de-coupled from the second spool.

In still other examples, a method may include using a transmission to selectively couple one of a first mechanical input and a second mechanical input to an electric machine. The transmission may include a mechanical output configured to couple to a part of the electric machine. The transmission may also include a sliding clutch configured to drive or be driven by the mechanical output. The transmission may further include a selective actuator configured to move the sliding clutch in order to selectively control which mechanical input drives or is driven by the mechanical output. The method may also include driving the electric machine using one of the mechanical inputs or driving one of the mechanical inputs using the electric machine via the transmission. One of the mechanical inputs may be a gearbox separate from the transmission configured to drive or be driven by an external mechanism. The electric machine may be configured to speed match the sliding clutch to one of the mechanical inputs to facilitate engagement.

Any single one or any combination of the following features may be used with any of the examples above.

The selective actuator may include at least one selector fork.

A first remotely controllable mechanical disconnect may mechanically decouple the first mechanical input from the transmission. A second remotely controllable mechanical disconnect may mechanically decouple the second mechanical input from the transmission. A third remotely controllable mechanical disconnect may mechanically decouple the electric machine from the transmission.

The first mechanical input may be a towershaft that drives or is driven by a first spool of a gas turbine engine. The second mechanical input may be a gearbox that drives or is driven by a second spool of the gas turbine engine.

The selective actuator may move the sliding clutch between (i) a first position in which the sliding clutch is mechanically coupled to the first mechanical input, (ii) a second position in which the sliding clutch is mechanically coupled to the second mechanical input, and (iii) a third position in which the sliding clutch is de-coupled from the first mechanical input and the second mechanical input.

The transmission may be an LRU separate from the first mechanical input, the second mechanical input, and the electric machine.

The mechanical output may include an output shaft axially aligned with the part of the electric machine. The first mechanical input may include a first input shaft axially aligned with the output shaft. The second mechanical input may include a second input shaft arranged in parallel with the output shaft.

The mechanical output may include an output shaft axially aligned with the part of the electric machine. The first mechanical input may include a first input shaft axially aligned with the output shaft. The second mechanical input may include a second input shaft coaxial with the output shaft.

The mechanical output may include an output shaft axially aligned with the part of the electric machine. The first mechanical input may include a first input shaft arranged in parallel with the output shaft. The second mechanical input may include a second input shaft axially aligned with the first input shaft.

The sliding clutch may include a first clutch and a second clutch mechanically linked by the selective actuator. The selective actuator may move the first clutch and the second clutch between (i) a first position in which the first clutch is mechanically coupled to the first mechanical input and the second clutch is de-coupled from the second mechanical input, (ii) a second position in which the first clutch is de-coupled from the first mechanical input and the second clutch is mechanically coupled to the second mechanical input, and (iii) a third position in which the first clutch is de-coupled from the first mechanical input and the second clutch is de-coupled from the second mechanical input.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 4, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, various types of aircraft can use generators to produce electric power, where the generators extract mechanical power from gas turbine engines. Often times, this power is extracted from a high-pressure (HP) spool because (i) the HP spool typically has a narrow speed range and (ii) generators are significantly lighter and simpler when designed for a narrow speed range. While gas turbine engines can use less fuel if power is extracted from a low-pressure (LP) spool, a generator would typically be very heavy if directly driven from the LP spool.

This disclosure provides various spool selection transmissions with towershaft connections. These transmissions are described in detail below. The spool selection transmissions can provide various benefits, such as improved driving of a generator or other electric machine using different spools of an engine. For example, the electric machine does not need to be sized for the full speed range of an LP spool, which can reduce the weight of the electric machine. Also, the electric machine can be selectively connected to the LP spool or the HP spool (or another spool) to assist in engine starting. In addition, the electric machine can extract power from the LP spool or another spool (rather than the HP spool) at lower speeds, which can reduce fuel consumption of the engine.

Figure 1:
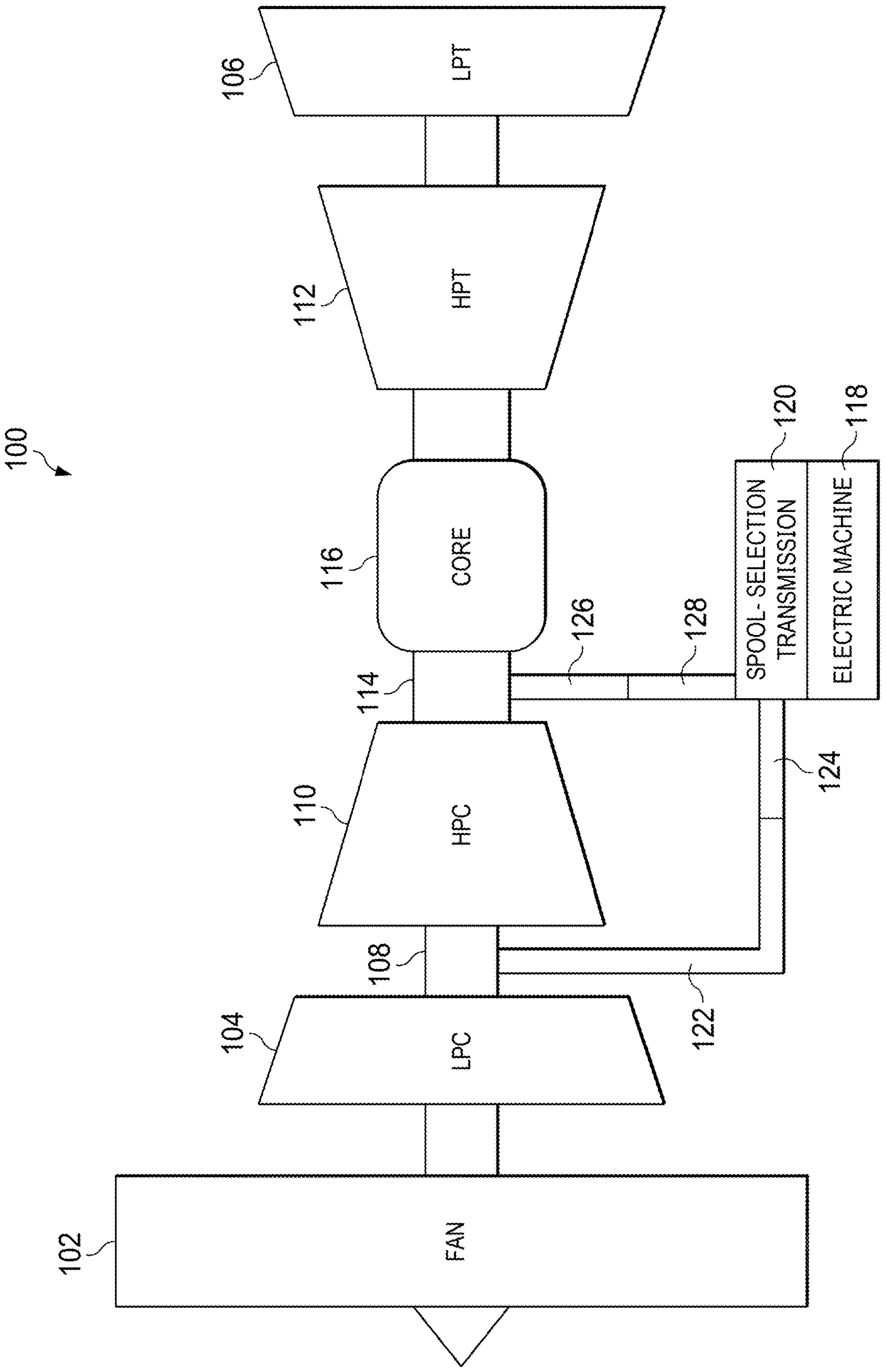
FIG. 1 illustrates an example gas turbine engine having a spool selection transmission and related components in accordance with this disclosure.

FIG. 1 illustrates an example gas turbine engine 100 having a spool selection transmission and related components in accordance with this disclosure. As shown in FIG. 1, the gas turbine engine 100 includes a fan section 102, which generally operates to drive air through one or more paths of the gas turbine engine 100. The gas turbine engine 100 also includes a low-pressure (LP) spool, where the LP spool includes a low-pressure compressor (LPC) 104, a low-pressure turbine (LPT) 106, and an inner shaft 108. The inner shaft 108 can be connected to the fan section 102, either directly or indirectly (such as via a speed change mechanism like a gear set). The gas turbine engine 100 further includes a high-pressure (HP) spool, where the HP spool includes a high-pressure compressor (HPC) 110, a high-pressure turbine (HPT) 112, and an outer shaft 114 and where the inner shaft 108 can pass through the outer shaft 114. An engine core 116 is positioned between the high-pressure compressor 110 and the high-pressure turbine 112 and can include various engine components, such as a combustor.

During operation, core airflow can be compressed by the low-pressure compressor 104 and by the high-pressure compressor 110, mixed and burned with fuel in the engine core 116, and expanded over the high-pressure turbine 112 and low-pressure turbine 106. The LP spool of the gas turbine engine 100 typically has a larger speed range compared to the HP spool of the gas turbine engine 100.

Note that this represents a simplified discussion of the gas turbine engine 100 and its design and operation. Additional details regarding the design and operation of gas turbine engines are known in the art. Moreover, this embodiment of the gas turbine engine 100 represents a two-spool turbofan engine. However, the gas turbine engine 100 may be implemented in any other suitable manner that includes at least two spools.

An electric machine 118 can be used in conjunction with the gas turbine engine 100. The electric machine 118 is configured to drive or to be driven by one of the spools of the gas turbine engine 100. As an example, the electric machine 118 may represent a generator that can be used to produce electrical power when driven by one of the spools of the gas turbine engine 100. As another example, the electric machine 118 may represent a motor or engine starter that can be used to produce electrical power for one of the spools of the gas turbine engine 100. Note that the electric machine 118 may also represent a combination of two or more of a generator, motor, or engine starter. In some embodiments, the electric machine 118 may be used to generate electrical power for one or more accessories or other subsystems of an aircraft.

In order to drive the electric machine 118 using the spools of the gas turbine engine 100 (or vice versa), a spool selection transmission 120 can be used to mechanically couple the electric machine 118 to either the LP spool or the HP spool of the gas turbine engine 100. For example, the spool selection transmission 120 may selectively couple the electric machine 118 to the LP spool or the HP spool of the gas turbine engine 100 depending on the operating mode of the electric machine 118 or the gas turbine engine 100. Thus, for instance, the spool selection transmission 120 may couple the electric machine 118 to the LP spool or to the HP spool during startup of the gas turbine engine 100. At lower speeds, the spool selection transmission 120 may couple the electric machine 118 to the LP spool when the LP spool is operating within a specified speed range (which can be smaller than the total speed range of the LP spool), such as when the LP spool is operating within the same speed range as the HP spool. At higher speeds, the spool selection transmission 120 may couple the electric machine 118 to the HP spool. In general, when the spool selection transmission 120 couples the electric machine 118 to the LP spool or the HP spool can vary depending on the circumstances and the application.

In this example, the spool selection transmission 120 can be mechanically coupled to the LP spool via one or more shafts 122 and one or more gears or gearsets 124 (such as at least one LP gear shaft). Similarly, the spool selection transmission 120 can be coupled to the HP spool via one or more shafts 126 and one or more gears or gearsets 128 (such as at least one HP gear shaft). The shafts 122, 126 and gears or gearsets 124, 128 can be used to provide rotational motion from the shafts 108, 114 to the electric machine 118 or to provide rotational motion from the electric machine 118 to the shafts 108, 114. However, note that other engine systems may have more than two spools, in which case the spool selection transmission 120 may selectively connect the electric machine 118 to those additional spools, as well.

In some embodiments, the spool selection transmission 120 may include a clutch that can be repositioned by a selector fork or other selective actuator, such as where the clutch can mechanically couple the electric machine 118 to one spool in one position and to another spool in another position. In other embodiments, the spool selection transmission 120 may include multiple clutches, each of which can mechanically couple the electric machine 118 to one of the spools. Each embodiment may also support a neutral position in which the electric machine 118 is not coupled to any of the spools.

As described in more detail below, the spool selection transmission 120 may incorporate a number of additional features as needed or desired. For example, the spool selection transmission 120 may be configured to speed match the electric machine 118 to one of the spools. As another example, the spool selection transmission 120 may include one or more position controllers (such as control pistons) and support one or more actuation techniques that are used to control the positioning of one or more clutches within the spool selection transmission 120. A number of other features of the spool selection transmission 120 are described below, any single one or any combination of which may be incorporated into the spool selection transmission 120 and used with the gas turbine engine 100.

Although FIG. 1 illustrates one example of a gas turbine engine 100 having an engine spool selection transmission and related components, various changes may be made to FIG. 1. For example, the spool selection transmission 120 may be used with any other suitable engines having multiple spools.

FIGS. 2A through 2D illustrate a first example system 200 including a spool selection transmission 120 in accordance with this disclosure. For ease of explanation, the spool selection transmission 120 shown in FIGS. 2A through 2D is described as being used in or with the gas turbine engine 100 of FIG. 1. However, the spool selection transmission 120 shown in FIGS. 2A through 2D may be used with any suitable engine having multiple spools.

Figure 2A:
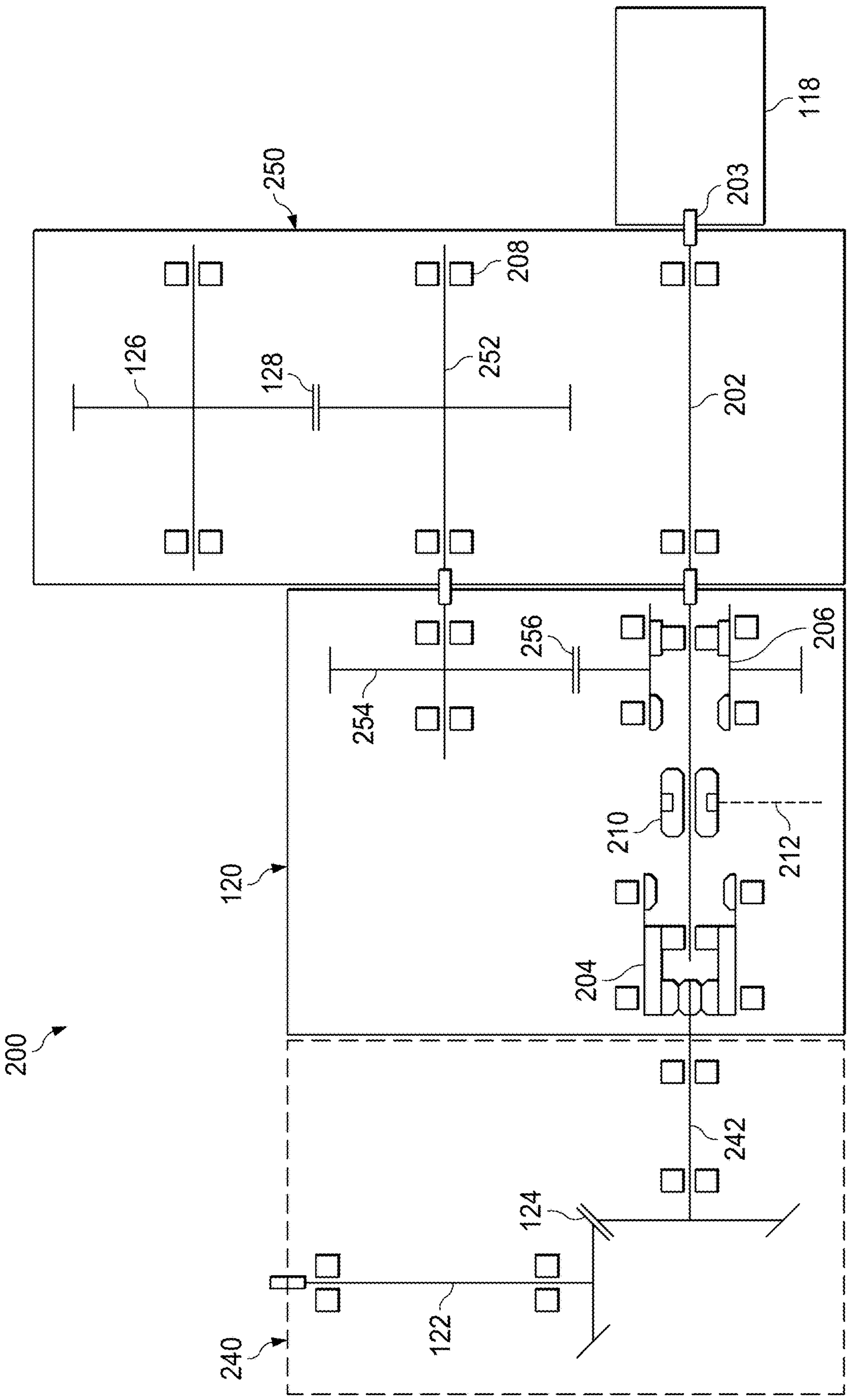
FIGS. 2A through 2D illustrate a first example system including a spool selection transmission in accordance with this disclosure.

As shown in FIG. 2A, the electric machine 118 includes or is coupled to a mechanical output, such as a shaft 202 via a spline 203. The shaft 202 is configured to be driven (rotated) by the electric machine 118 in order to provide mechanical energy to one of the spools of the gas turbine engine 100 and/or to be driven (rotated) by one of the spools of the gas turbine engine 100 in order to provide mechanical energy to the electric machine 118. Two gear shafts 204 and 206 are co-axial with the shaft 202. The gear shaft 204 includes or is associated with one or more gears or gearsets that can drive or be driven by a first mechanical input (such as the LP spool), and the gear shaft 206 includes or is associated with one or more gears or gearsets that can drive or be driven by a second mechanical input (such as the HP spool). For example, the LP spool can spin the one or more gears or gearsets 124, causing rotation of the gear shaft 204 (or vice versa). Similarly, the HP spool can spin the one or more gears or gearsets 128, causing rotation of the gear shaft 206 (or vice versa). Note that while each gear shaft 204 and 206 is co-axial with the shaft 202, each gear shaft 204 and 206 can ride on bearings 208 and may or may not spin at the same speed as the shaft 202.

In this example, a sliding clutch 210 can be moved to engage with each gear shaft 204 and 206 in order to control which of the spools (if any) is driving or being driven by the shaft 202. For example, in some embodiments, the sliding clutch 210 may include splines on its inner diameter and on its outer diameter. The splines on the inner diameter of the sliding clutch 210 can be connected to the shaft 202 so that the sliding clutch 210 rotates at the same speed as the shaft 202. Each of the gear shafts 204 and 206 may also include one or more splines on its inner diameter, and these splines can mate with the spline(s) on the outer diameter of the sliding clutch 210. This allows the sliding clutch 210 to selectively mate with either of the gear shafts 204 and 206 in order to mechanically couple the shaft 202 with either of the first mechanical input or the second mechanical input (such as with different spools of the gas turbine engine 100). Note, however, that designs other than spline connections may be used here, such as dog tooth interfaces between each of the gear shafts 204 and 206 and the sliding clutch 210.

In the example of FIGS. 2A through 2D, the spool selection transmission 120 is a line replaceable unit (LRU), which (i) can be separate from the electric machine 118 and a towershaft 240 that includes the one or more shafts 122 and one or more gears or gearsets 124 and (ii) can be separate from a gearbox 250 that includes the one or more shafts 126 and one or more gears or gearsets 128. Also, in the example of FIGS. 2A through 2D, the electric machine 118 is arranged on the same centerline as a towershaft input shaft 242 with the shaft 202 passing through the gearbox 250, which can provide an efficient package for the system 200. The one or more shafts 126 and one or more gears or gearsets 128 engage with the gear shaft 206 via a gearbox input shaft 252 (which is parallel to the shaft 202) and one or more shafts 254 and one or more gears or gearsets 256 included within spool selection transmission 120.

A selector fork 212 or other selective actuator is used to move the sliding clutch 210 to one of multiple positions. For example, the selector fork 212 may include or be coupled to a control piston or other position controller, which can move the selector fork or other selector fork 212 into various positions. Thus, for instance, the selector fork 212 can slide or otherwise move the sliding clutch 210 into various positions based on movement provided by the position controller, thereby controlling if and how the spool selection transmission 120 mechanically couples the shaft 202 to one of the spools of the gas turbine engine 100.

Figure 2B:
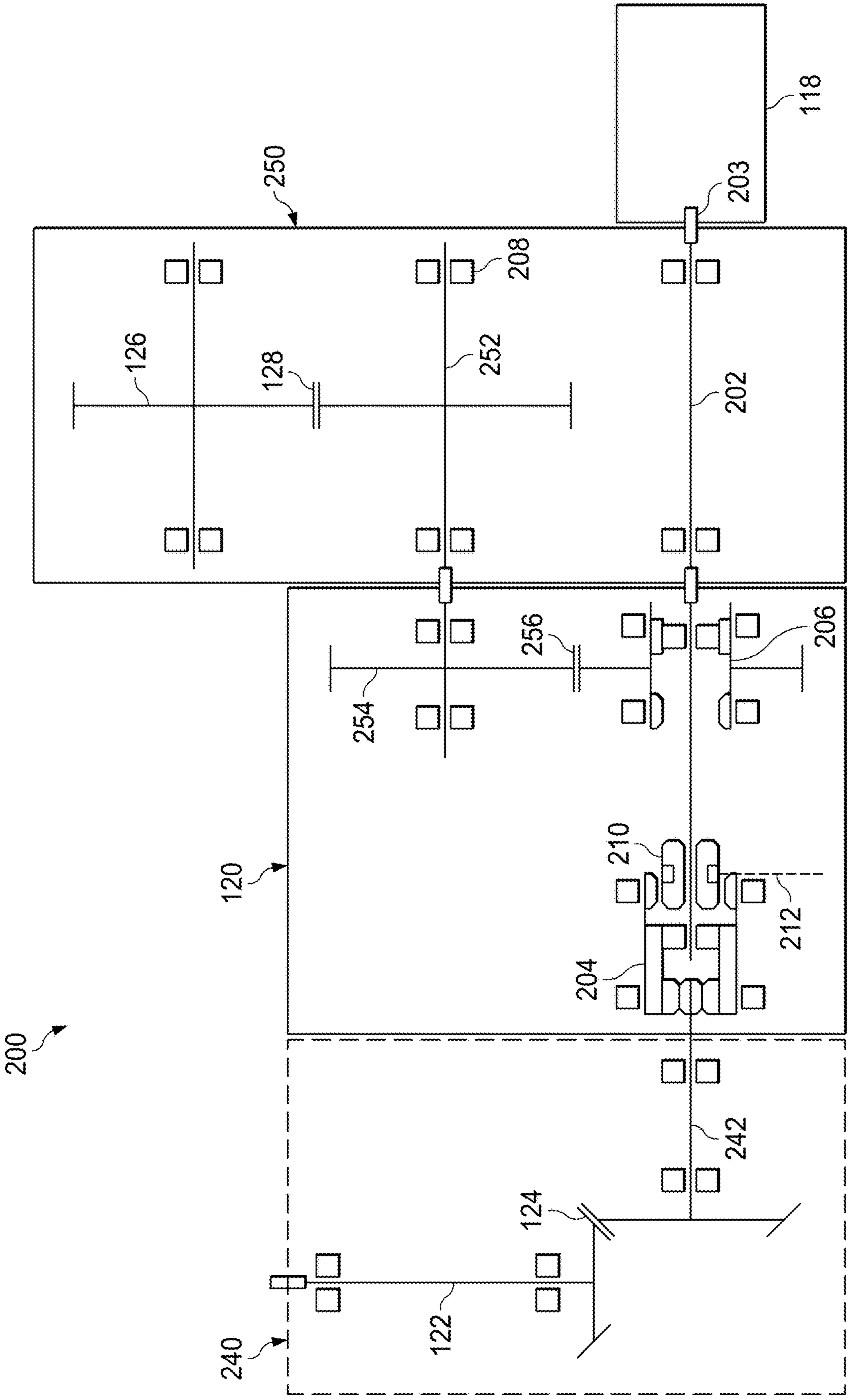
Figure 2C:
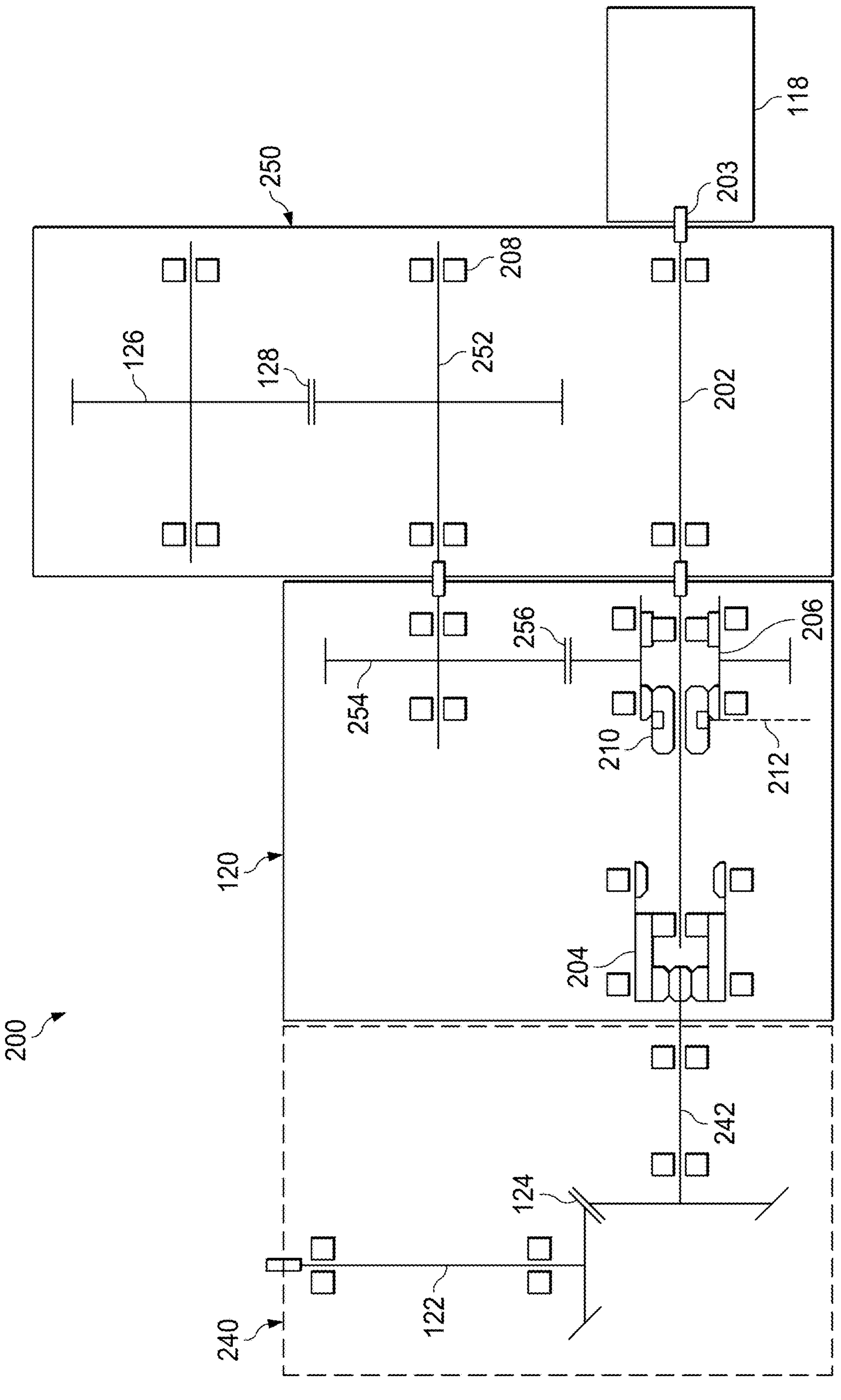

In some embodiments, the selector fork 212 can be used to move the sliding clutch 210 into at least three positions. As shown in FIG. 2A, the sliding clutch 210 is in a neutral position, meaning the sliding clutch 210 is not engaged with either of the gear shafts 204 and 206. As a result, the shaft 202 does not drive and is not driven by any of the spools of the gas turbine engine 100. As shown in FIG. 2B, the sliding clutch 210 has been moved into a first engaged position where the sliding clutch 210 engages with the gear shaft 204. In this configuration, the shaft 202 drives or is driven by the LP spool of the gas turbine engine 100. As shown in FIG. 2C, the sliding clutch 210 has been moved into a second engaged position where the sliding clutch 210 engages with the gear shaft 206. In that configuration, the shaft 202 drives or is driven by the HP spool of the gas turbine engine 100.

In order to control which spool of the gas turbine engine 100 is driving or being driven by the electric machine 118, the following process may be performed. Assume that the sliding clutch 210 has the position shown in FIG. 2B, meaning the electric machine 118 is driving or being driven by the LP spool of the gas turbine engine 100. To shift the electric machine 118 to drive or to be driven by the HP spool, the electric machine 118 can be commanded to stop generating electrical power, and the selector fork 212 can move the sliding clutch 210 into the neutral position shown in FIG. 2A. At this point, the speed of the shaft 202 can be matched substantially to the speed of the gear shaft 206. Once adequate speed matching is achieved, the selector fork 212 can move the sliding clutch 210 into the position shown in FIG. 2C, and the electric machine 118 can begin generating electrical power again. The same process may occur when moving the sliding clutch 210 from the position shown in FIG. 2C to the position shown in FIG. 2B.

As noted above, the speed of the shaft 202 can be matched substantially to the speed of one of the gear shafts 204 or 206 when the sliding clutch 210 is being engaged with that gear shaft 204 or 206. In some embodiments, this can be achieved by controlling the electric machine 118 to operate in a motor mode, such as by controlling the electric machine 118 to speed up or slow down rotation of the shaft 202. In other cases, a synchronizer or other component can be used to achieve this speed match.

Figure 2D:
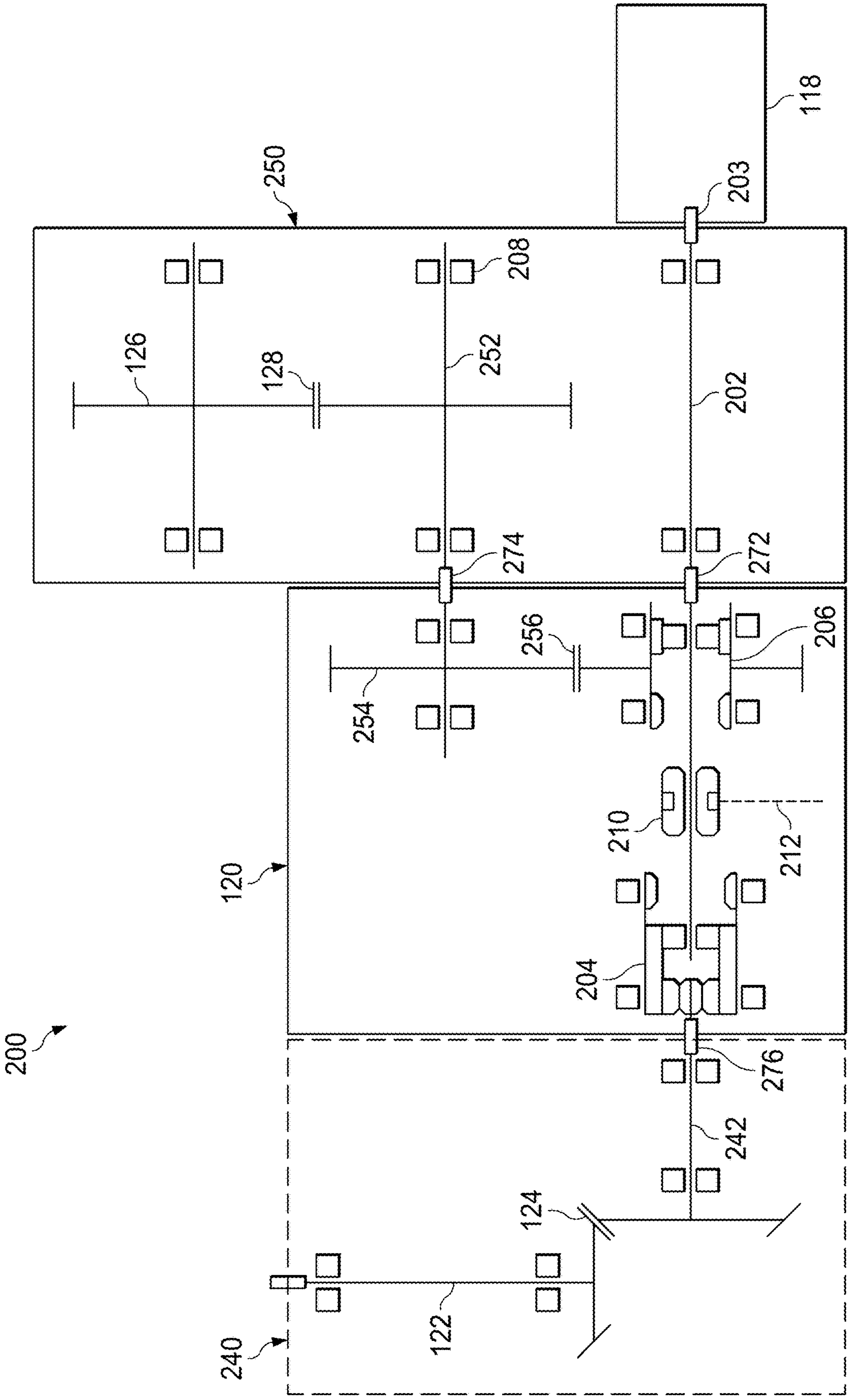

In some embodiments, the system 200 may include one or remotely controllable mechanical disconnects (such as one or more electronically, mechanically, hydraulically, or pneumatically actuated clutches) to mechanically decouple one or more of the electric machine 118, the LP spool, or the HP spool from the spool selection transmission 120. For example, as shown in FIG. 2D, the spool selection transmission 120 may include one or more of remotely controllable mechanical disconnects 272, 274, and 276, which may respectively decouple the shafts 202, 242 and 252 from the spool selection transmission 120 during operation of the system 200. During a malfunction of the system 200, an operator of the system 200 may command one or more of the mechanical disconnects 272, 274, and 276 to decouple from the shafts 202, 242 or 252 to mitigate damage to the components of system 200, or one or more of the mechanical disconnects 272, 274, and 276 may be controlled automatically.

Although FIGS. 2A through 2D illustrate one example of a system 200 including a spool selection transmission 120, various changes may be made to FIGS. 2A through 2D. For example, the various components within spool selection transmission 120 can be arranged in any suitable manner. In general, it is possible to use a variety of shafts, gears/gear sets, and/or other components to mechanically couple a spool selection transmission 120 to multiple spools of an engine and to mechanically transfer rotational energy to, from, or within a spool selection transmission 120. While a specific arrangement of components is shown in FIGS. 2A through 2D, this specific arrangement is for illustration and explanation only.

Figure 3:
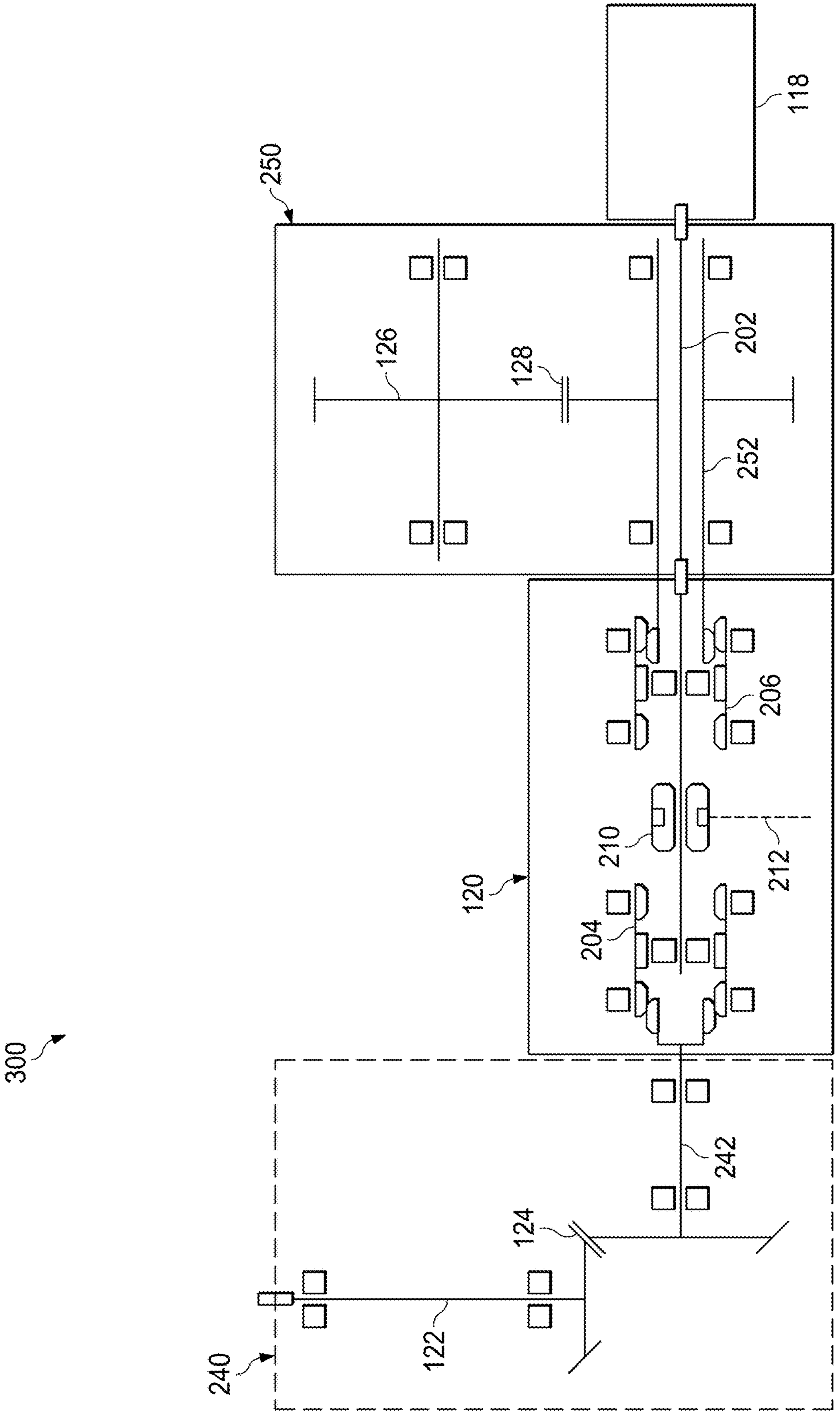
FIG. 3 illustrates a second example system including a spool selection transmission in accordance with this disclosure.

FIG. 3 illustrates a second example system 300 including a spool selection transmission 120 in accordance with this disclosure. The system 300 shown in FIG. 3 is similar to the system 200 shown in FIGS. 2A through 2D. For example, the sliding clutch 210 can be moved to the left to engage with the LP spool, moved to the right to engage with the HP spool, or maintained in a neutral position. In FIG. 3, however, the spool selection transmission 120 and gearbox 250 have a different mechanical arrangement. Here, the input shaft 252 is coaxial with shaft 202, and the one or more shafts 254 and the one or more gears or gearsets 256 are omitted. This provides a packaging advantage over the configuration of system 200 due to the elimination of a centerline.

Figure 4:
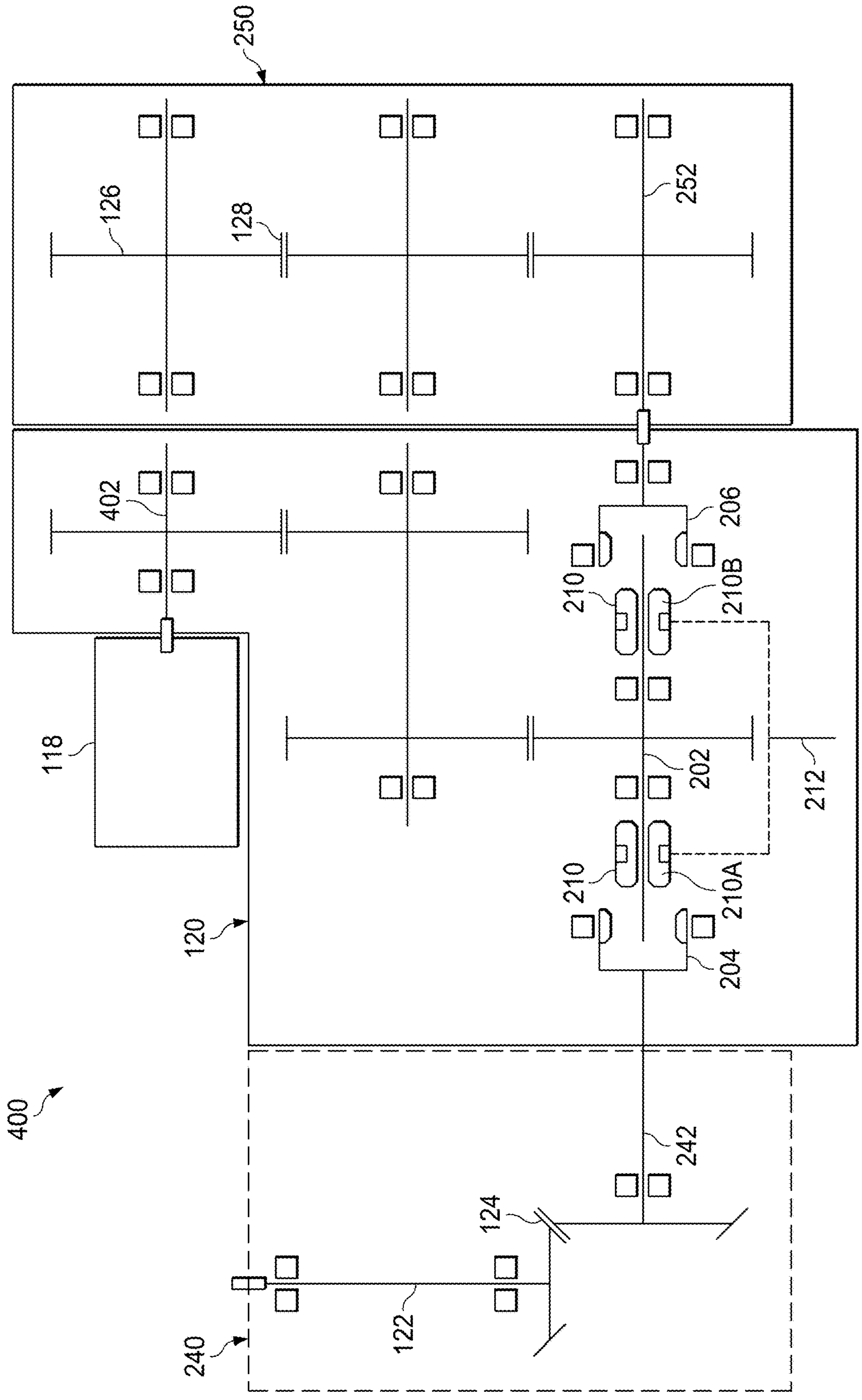
FIG. 4 illustrates a third example system including a spool selection transmission in accordance with this disclosure.

FIG. 4 illustrates a third example system 400 including a spool selection transmission 120 in accordance with this disclosure. The system 400 shown in FIG. 4 is similar to the system 200 shown in FIGS. 2A through 2D. For example, the sliding clutch 210 can be moved to the left to engage with the LP spool, moved to the right to engage with the HP spool, or maintained in a neutral position. In FIG. 4, however, the spool selection transmission 120, the gearbox 250, and the electric machine 118 have a different mechanical arrangement. Here, the input where the shaft 202 does not pass through the gearbox 250. This provides an advantage over systems 200 and 300 in that volume on the "right hand" side of the gearbox 250 is reduced by mounting the electric machine 118 directly to the transmission 120. In some embodiments, a bevel gear may be used to align the axis of rotation of electric machine 118 perpendicular to the shaft 202.

In FIG. 4, the input shaft 252 is axially aligned with the input shaft 242, and the one or more shafts 254 and the one or more gears or gearsets 256 are omitted. To interface with the shaft 202, the electric machine 118 is mechanically coupled to an output shaft 402 (arranged parallel with input shaft 242), which is mechanically coupled to shaft 202 via a plurality of additional shafts and gearsets within the spool selection transmission 120.

Also, in FIG. 4, the sliding clutch 210 includes a first clutch 210A that provides selectable mechanical coupling to the gear shaft 204 and a second clutch 210B that provides selectable mechanical coupling to the gear shaft 206. In some embodiments, the selector fork 212 can be used to move the sliding clutch 210 into at least three positions. As shown in FIG. 4, the sliding clutch 210 is in a neutral position, meaning the first clutch 210A is not engaged with the gear shaft 204 and the second clutch 210B is not engaged with the gear shaft 206. As a result, the shaft 202 does not drive and is not driven by any of the spools of the gas turbine engine 100. Similar as shown in FIG. 2B, the sliding clutch 210 can been moved into a first engaged position, where the first clutch 210A engages with the gear shaft 204. In this configuration, the shaft 202 drives or is driven by the LP spool of the gas turbine engine 100. Similar as shown in FIG. 2C, the sliding clutch 210 can been moved into a second engaged position, where the second clutch 210B engages with the gear shaft 206. In that configuration, the shaft 202 drives or is driven by the HP spool of the gas turbine engine 100. Although the sliding clutch 210 is shown as including the first clutch 210A and the second clutch 210B, in some embodiments, the first clutch 210A and the second clutch 210B may not be separate components. For example, in some embodiments, the first clutch 210A and the second clutch 210B may be mechanically linked to translate and rotate together.

Although FIGS. 3 and 4 illustrate various examples of systems with a spool selection transmissions 120, various changes may be made to FIGS. 3 and 4. For example, the various components within each spool selection transmission 120 can be arranged in any suitable manner. In general, it is possible to use a variety of shafts, gears/gear sets, and/or other components to mechanically couple a spool selection transmission 120 to multiple spools of an engine and to mechanically transfer rotational energy to, from, or within a spool selection transmission 120. While specific arrangements of components are shown in FIGS. 3 and 4, these specific arrangements are for illustration and explanation only.

It should be noted that while the gas turbine engine 100 is described above as having two spools, other gas turbine engines can have more than two spools. For example, a gas turbine engine could have an LP spool, an intermediate-pressure (IP) spool, and an HP spool. In some cases, various spool selections transmissions described above could be configured for use with any two of three or more spools. In other cases, various spool selection transmissions described above could be expanded for use with more than two spools.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus configured to selectively couple one of a first mechanical input and a second mechanical input to an electric machine, wherein the apparatus comprises:
- a mechanical output configured to couple to a part of the electric machine;
- a sliding clutch configured to drive or be driven by the mechanical output; and
- a selective actuator configured to move the sliding clutch in order to selectively control which mechanical input drives or is driven by the mechanical output;
- wherein the second mechanical input is a gearbox configured to drive or be driven by an external mechanism.

2. The apparatus of claim 1, further comprising at least one of:
- a first remotely controllable mechanical disconnect configured to mechanically decouple the first mechanical input from the apparatus;
- a second remotely controllable mechanical disconnect configured to mechanically decouple the second mechanical input from the apparatus; and
- a third remotely controllable mechanical disconnect configured to mechanically decouple the electric machine from the apparatus.

3. The apparatus of claim 1, wherein:
- the first mechanical input is a towershaft configured to drive or be driven by a first spool of a gas turbine engine; and
- the external mechanism is a second spool of the gas turbine engine.

4. The apparatus of claim 1, wherein the selective actuator is configured to move the sliding clutch between:
- a first position in which the sliding clutch is mechanically coupled to the first mechanical input;
- a second position in which the sliding clutch is mechanically coupled to the second mechanical input; and
- a third position in which the sliding clutch is de-coupled from the first mechanical input and the second mechanical input.

5. The apparatus of claim 1, wherein the apparatus is a line replaceable unit (LRU) separate from the first mechanical input, the second mechanical input, and the electric machine.

6. The apparatus of claim 1, wherein:
- the mechanical output comprises an output shaft configured to be axially aligned with the part of the electric machine;
- the first mechanical input comprises a first input shaft configured to be axially aligned with the output shaft; and
- the second mechanical input comprises a second input shaft configured to be arranged in parallel with the output shaft.

7. The apparatus of claim 1, wherein:
- the mechanical output comprises an output shaft configured to be axially aligned with the part of the electric machine;
- the first mechanical input comprises a first input shaft configured to be axially aligned with the output shaft; and
- the second mechanical input comprises a second input shaft configured to be coaxial with the output shaft.

8. The apparatus of claim 1, wherein:
- the mechanical output comprises an output shaft configured to be axially aligned with the part of the electric machine;
- the first mechanical input comprises a first input shaft configured to be arranged in parallel with the output shaft; and
- the second mechanical input comprises a second input shaft configured to be axially aligned with the first input shaft.

9. The apparatus of claim 1, wherein:
- the sliding clutch comprises a first clutch and a second clutch mechanically linked by the selective actuator; and
- the selective actuator is configured to move the first clutch and the second clutch between:
  - a first position in which the first clutch is mechanically coupled to the first mechanical input and the second clutch is de-coupled from the second mechanical input;
  - a second position in which the first clutch is de-coupled from the first mechanical input and the second clutch is mechanically coupled to the second mechanical input; and
  - a third position in which the first clutch is de-coupled from the first mechanical input and the second clutch is de-coupled from the second mechanical input.

10. A system comprising:
- an electric machine configured to selectively drive or be driven by one of multiple spools of a gas turbine engine; and
- a spool selection transmission configured to selectively couple the one of the multiple spools to the electric machine, the spool selection transmission comprising:
  - a mechanical output configured to couple to a part of the electric machine;
  - a sliding clutch configured to drive or be driven by the mechanical output; and
  - a selective actuator configured to move the sliding clutch in order to selectively control which of the spools drives or is driven by the mechanical output; and
- a gearbox mechanically coupling a first of the spools to the spool selection transmission via a first input shaft;
- wherein the electric machine is configured to speed match the sliding clutch to the one of the spools to facilitate engagement.

11. The system of claim 10, further comprising at least one of:

a first remotely controllable mechanical disconnect configured to mechanically decouple the first of the spools from the spool selection transmission;

a second remotely controllable mechanical disconnect configured to mechanically decouple a second of the spools from the spool selection transmission; and a third remotely controllable mechanical disconnect configured to mechanically decouple the electric machine from the spool selection transmission.

12. The system of claim 10, wherein the selective actuator is configured to move the sliding clutch between:

a first position in which the sliding clutch is mechanically coupled to the first spool;

a second position in which the sliding clutch is mechanically coupled to a second of the spools; and a third position in which the sliding clutch is de-coupled from the first spool and the second spool.

13. The system of claim 10, further comprising:

a towershaft mechanically coupling a second of the spools to the spool selection transmission via a second input shaft.

14. The system of claim 13, wherein the spool selection transmission is a line replaceable unit (LRU) separate from the towershaft, the gearbox, and the electric machine.

15. The system of claim 14, wherein:

the mechanical output comprises an output shaft configured to be axially aligned with the part of the electric machine, the output shaft passing through the gearbox;

the second input shaft is axially aligned with the output shaft; and the first input shaft is arranged in parallel with the output shaft.

16. The system of claim 14, wherein:

the mechanical output comprises an output shaft configured to be axially aligned with the part of the electric machine, the output shaft passing through the gearbox;

the second input shaft is axially aligned with the output shaft; and the first input shaft is coaxial with the output shaft.

17. The system of claim 14, wherein:

the mechanical output comprises an output shaft configured to be axially aligned with the part of the electric machine;

the second input shaft is arranged in parallel with the output shaft; and the first input shaft is axially aligned with the second input shaft.

18. The system of claim 17, wherein:

the sliding clutch comprises a first clutch and a second clutch mechanically linked by the selective actuator; and the selective actuator is configured to move the first clutch and the second clutch between:

a first position in which the first clutch is mechanically coupled to the first of the spools and the second clutch is de-coupled from a second of the spools;

a second position in which the first clutch is de-coupled from the first spool and the second clutch is mechanically coupled to the second spool; and a third position in which the first clutch is de-coupled from the first spool and the second clutch is de-coupled from the second spool.

19. A method comprising:

using a transmission to selectively couple one of a first mechanical input and a second mechanical input to an electric machine, the transmission comprising:

a mechanical output configured to couple to a part of the electric machine;

a sliding clutch configured to drive or be driven by the mechanical output; and a selective actuator configured to move the sliding clutch in order to selectively control which mechanical input drives or is driven by the mechanical output; and driving the electric machine using one of the mechanical inputs or driving one of the mechanical inputs using the electric machine via the transmission;

wherein one of the mechanical inputs is a gearbox separate from the transmission configured to drive or be driven by an external mechanism; and wherein the electric machine is configured to speed match the sliding clutch to one of the mechanical inputs to facilitate engagement.

20. The method of claim 19, wherein the selective actuator moves the sliding clutch between:

a first position in which the sliding clutch is mechanically coupled to the first mechanical input;

a second position in which the sliding clutch is mechanically coupled to the second mechanical input; and a third position in which the sliding clutch is de-coupled from the first mechanical input and the second mechanical input.

* * * * *